(12) United States Patent
Labbe et al.

(10) Patent No.: US 11,203,948 B2
(45) Date of Patent: Dec. 21, 2021

(54) SEAL RUNNER AND METHOD

(71) Applicant: PRATT & WHITNEY CANADA CORP., Longueuil (CA)

(72) Inventors: Michel Labbe, Montreal (CA); Steve Fett, Kirkland (CA); Ho-Wing Edmund Leung, Chambly (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 157 days.

(21) Appl. No.: 16/563,152

(22) Filed: Sep. 6, 2019

(65) Prior Publication Data

US 2021/0071540 A1 Mar. 11, 2021

(51) Int. Cl.
| | |
|---|---|
| *F01D 11/00* | (2006.01) |
| *F01D 25/18* | (2006.01) |
| *F02C 7/28* | (2006.01) |
| *F02C 7/06* | (2006.01) |
| *F01D 25/12* | (2006.01) |

(52) U.S. Cl.
CPC .......... *F01D 11/003* (2013.01); *F01D 25/183* (2013.01); *F01D 25/12* (2013.01); *F02C 7/06* (2013.01); *F02C 7/28* (2013.01); *F05D 2220/323* (2013.01); *F05D 2230/60* (2013.01); *F05D 2240/55* (2013.01); *F05D 2240/60* (2013.01); *F05D 2240/70* (2013.01); *F05D 2260/232* (2013.01); *F05D 2260/98* (2013.01); *F05D 2300/224* (2013.01)

(58) Field of Classification Search
CPC ...... F01D 11/003; F01D 25/183; F01D 25/12; F02C 7/28; F02C 7/06; F05D 2240/55; F05D 2260/232; F05D 2240/60; F05D 2260/98; F05D 2300/224; F05D 2230/60; F05D 2220/323; F05D 2240/70
USPC .......................................................... 415/111
See application file for complete search history.

(56) References Cited

U.S. PATENT DOCUMENTS

| | | | |
|---|---|---|---|
| 2,956,824 A | | 10/1960 | Kuchler et al. |
| 2,992,842 A | * | 7/1961 | Shevchenko ......... F01D 11/003 277/306 |
| 3,915,521 A | | 10/1975 | Young |
| 4,086,759 A | | 5/1978 | Karstensen et al. |
| 4,406,459 A | | 9/1983 | Davis et al. |
| 4,465,427 A | | 8/1984 | Libertini et al. |
| 4,648,485 A | * | 3/1987 | Kovaleski ............... F01D 25/18 184/13.1 |

(Continued)

*Primary Examiner* — J. Todd Newton
(74) *Attorney, Agent, or Firm* — Norton Rose Fulbright Canada LLP

(57) ABSTRACT

The contact seal assembly for a shaft of a gas turbine engine includes a carbon seal mounted in a fixed position within a seal housing, and an annular seal runner adapted to be connected to the shaft of the gas turbine engine and rotatable relative to the carbon ring segments. The seal runner is disposed adjacent to and radially inwardly from the carbon ring segments to form a contact interface between the seal runner and the carbon ring segments which forms a substantially fluid tight seal. The seal runner includes a coolant scoop disposed in a cavity defined by the seal housing, a first slinger disposed between the coolant scoop and the contact interface, a second slinger disposed between the first slinger and the contact interface, and a coolant collector groove disposed between the first slinger and the second slinger.

19 Claims, 12 Drawing Sheets

(56) References Cited

U.S. PATENT DOCUMENTS

| | | | |
|---|---|---|---|
| 4,683,714 A | 8/1987 | Thebert | |
| 4,969,652 A | 11/1990 | Munson | |
| 5,301,957 A | 4/1994 | Hwang et al. | |
| 5,558,341 A | 9/1996 | McNickle et al. | |
| 5,568,984 A | 10/1996 | Williams | |
| 5,593,165 A | 1/1997 | Murray et al. | |
| 5,639,096 A | 6/1997 | Ullah | |
| 5,813,830 A | 9/1998 | Smith et al. | |
| 6,145,843 A | 11/2000 | Hwang | |
| 6,409,464 B1 * | 6/2002 | Fisher | F01D 25/16 384/475 |
| 6,996,968 B2 | 2/2006 | Peters et al. | |
| 7,252,291 B2 | 8/2007 | Khonsari et al. | |
| 7,334,982 B2 | 2/2008 | Singh et al. | |
| 7,410,341 B2 | 8/2008 | Gockel et al. | |
| 7,699,530 B2 | 4/2010 | Blais | |
| 7,905,495 B2 | 3/2011 | Munson | |
| 8,678,741 B2 | 3/2014 | Olennikov et al. | |
| 8,845,282 B2 | 9/2014 | Lapierre et al. | |
| 8,945,284 B2 | 2/2015 | Short et al. | |
| 9,631,508 B2 | 4/2017 | Blais et al. | |
| 9,897,005 B2 | 2/2018 | Chilton et al. | |
| 9,944,399 B2 | 4/2018 | Desjardins | |
| 9,989,083 B2 * | 6/2018 | Labbe | F02C 7/06 |
| 2004/0179935 A1 * | 9/2004 | Maguire | F16J 15/162 415/111 |
| 2006/0037325 A1 | 2/2006 | Peters et al. | |
| 2006/0081419 A1 | 4/2006 | Care et al. | |
| 2014/0119887 A1 | 5/2014 | Lyle et al. | |
| 2014/0140824 A1 | 5/2014 | Sheridan | |
| 2014/0369832 A1 * | 12/2014 | Blais | F01D 11/02 415/230 |
| 2016/0040544 A1 | 2/2016 | Desjardins | |
| 2016/0348792 A1 | 12/2016 | Labbe | |

\* cited by examiner

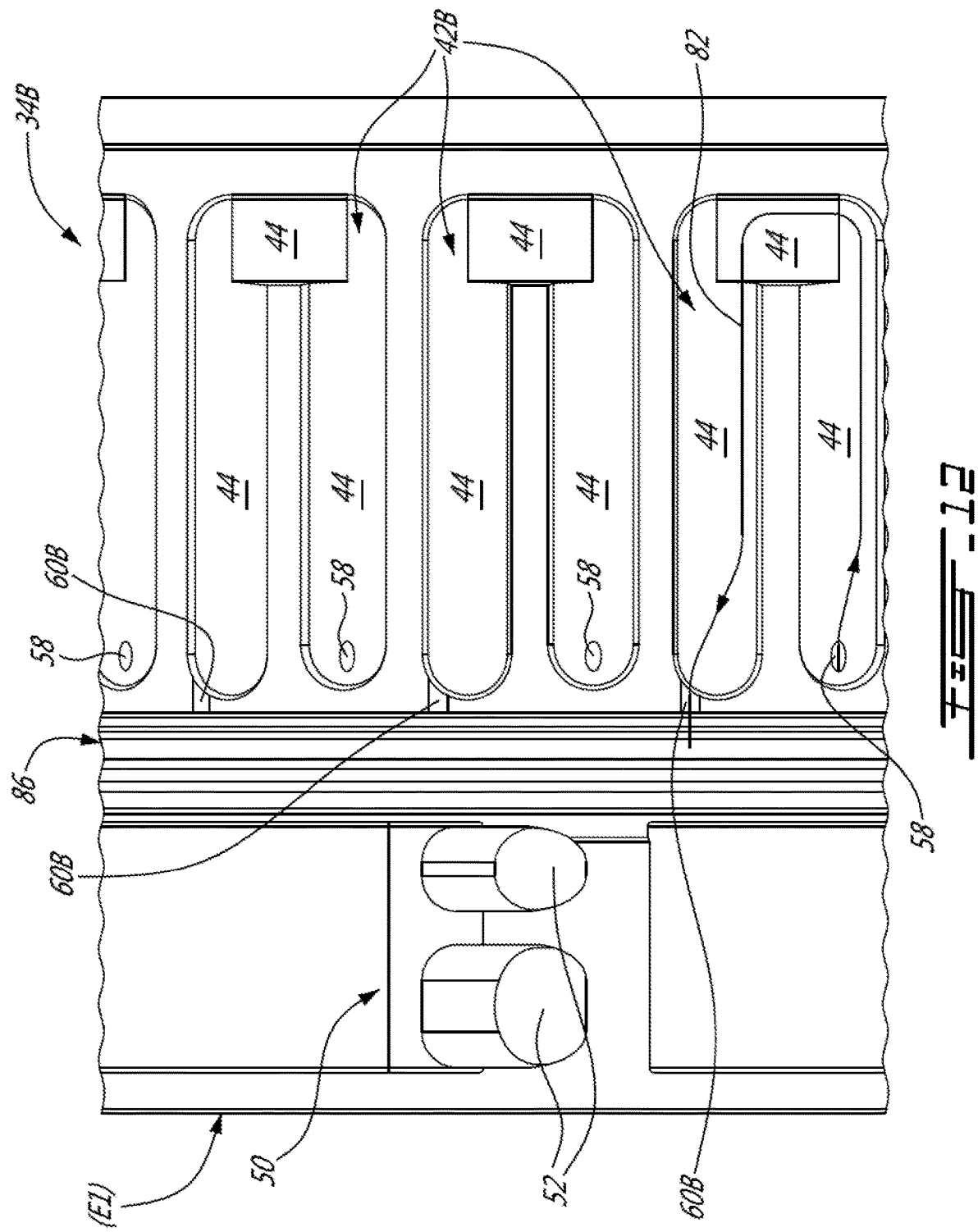

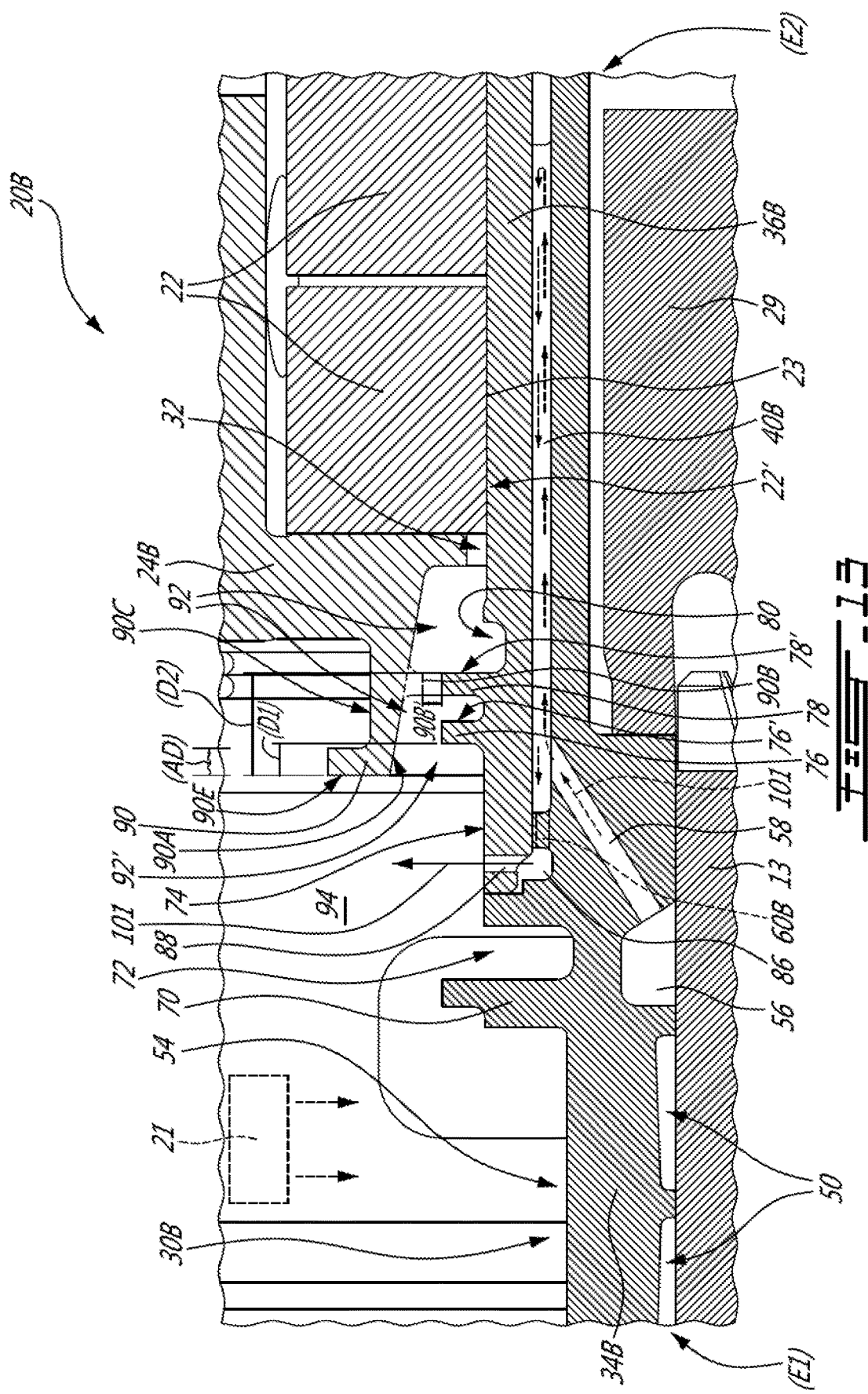

SEAL RUNNER AND METHOD

TECHNICAL FIELD

The technology relates generally to gas turbine engines, and more particularly to seals for rotating components in a gas turbine engine.

BACKGROUND

Contact seals, often called carbon seals, are commonly used to provide a fluid seal around a rotating shaft, particularly high speed rotating shafts used in high temperature environments such as in gas turbine engines. Prior art contact seals are usually suitable for their intended purposes. However, in some applications, such as aircraft engine applications, and in some operating conditions, such as during aircraft engine motoring, at least some prior art contact seals may leak.

Accordingly, improved shaft contact seals are sought.

SUMMARY

There is accordingly provided a contact seal assembly for a shaft of a gas turbine engine, comprising: a carbon seal mounted in a fixed position within a seal housing of the gas turbine engine; and an annular seal runner adapted to be connected to the shaft of the gas turbine engine and rotatable relative to the carbon ring segments, the seal runner being disposed adjacent to and radially inwardly from the carbon ring segments to form a contact interface between the seal runner and the carbon ring segments which forms a substantially fluid tight seal; the seal runner having: a coolant scoop disposed in a cavity defined by the seal housing, a first slinger disposed between the coolant scoop and the contact interface, a second slinger disposed between the first slinger and the contact interface, and a coolant collector groove disposed between the first slinger and the second slinger.

There is also provided a gas turbine engine comprising one or more compressors, a combustor and one or more turbines, at least one of said compressors and at least one of said turbines being interconnected by an engine shaft rotating about a longitudinal axis thereof, at least one contact shaft seal being disposed about the rotating engine shaft to provide a fluid seal therewith, the contact shaft seal comprising a carbon seal mounted in a fixed position within a housing, and an annular seal runner fixed to the engine shaft for rotation within the carbon seal, the seal runner abutting the carbon seal during rotation of the seal runner to form a contact interface therebetween which forms a substantially fluid tight shaft seal, the seal runner having concentric inner and outer annular portions which define therebetween an internal fluid passage enclosed within the seal runner, the fluid passage defining a tortuous fluid flow path through the fluid passage and receiving cooling fluid therein for cooling the seal runner from within, the seal runner having an oil scoops disposed in fluid flow communication with the internal fluid passage to feed cooling oil into said fluid passage, a first slinger disposed between the oil scoop and the contact interface, a second slinger disposed between the first slinger and the contact interface, and an oil collector groove disposed between the first slinger and the second slinger.

There is further provided a method of cooling an annular seal runner engaged to a shaft and being part of a shaft seal assembly received at least in part in a seal housing and having a carbon seal secured to the seal housing, the carbon seal abutting the seal runner during relative rotation between the seal runner and the carbon seal to form a contact interface between an outer runner surface of the seal runner and an inner surface of the carbon seal to form a fluid seal around the shaft, the method comprising: circulating a coolant through the seal runner and over at least a portion of an outer surface of the seal runner that is disposed inside the seal housing outside of the contact interface; and slinging at least some of the coolant contacting the portion of the outer surface radially away from the outer surface by all of: a first slinger disposed between a coolant scoop of the seal runner and the contact interface, a second slinger disposed between the first slinger and the contact interface, and a coolant collector groove defined in a radially outer surface of the seal runner axially between the first slinger and the second slinger.

Further details of these and other aspects of the present technology will be apparent from the detailed description and figures included below.

BRIEF DESCRIPTION OF THE DRAWINGS

Reference is now made to the accompanying figures depicting aspects of the present technology, in which:

FIG. 12 is a close-up view of an inner annular portion of the seal runner of FIG. 10;

FIG. 13 is a cross-sectional view of an upper part of the contact seal assembly and the seal runner of FIG. 10;

DETAILED DESCRIPTION

Figure 1:
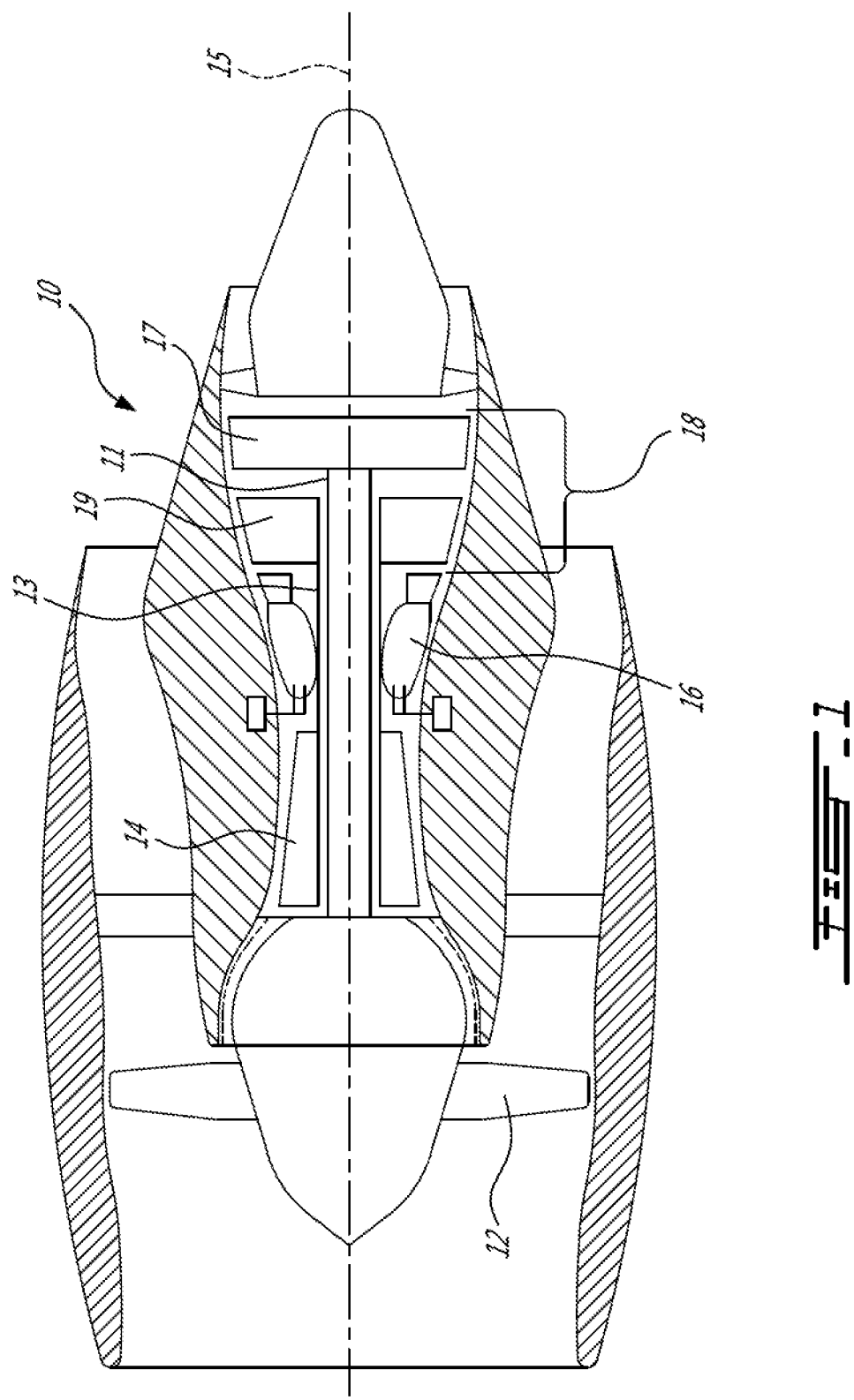
FIG. 1 is schematic cross-section of a gas turbine engine.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

In the depicted embodiment, the turbine section 18 comprises a low pressure turbine 17 and a high pressure turbine 19. The engine 10 also preferably includes at least two rotating main engine shafts, namely a first inner shaft 11 interconnecting the fan 12 with the low pressure turbine 17, and a second outer shaft 13 interconnecting the compressor 14 with the high pressure turbine 19. The inner and outer main engine shafts 11 and 13 are concentric and rotate about the centerline axis 15 which is preferably collinear with their longitudinal axes.

The main engine shafts 11, 13 are supported at a plurality of points by bearings, and extend through several engine cavities. As such, a number of shaft seals are provided to ensure sealing about the shafts at several points along their length to prevent unwanted fluid leaking from one engine compartment or cavity. For example, compressed air in the main engine gas path must be kept separate from the secondary cooling air or bearing lubrication oil in bearing cavities and cooling cavities adjacent to the main engine gas path.

Figure 2:
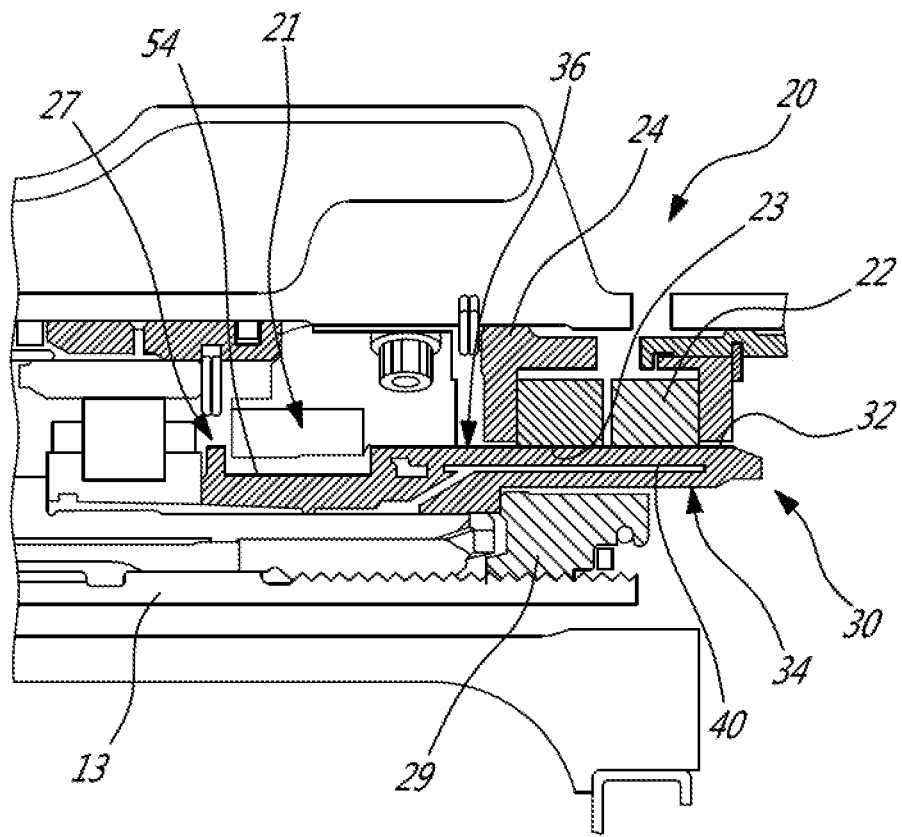
FIG. 2 is a partial cross-sectional view of a contact seal assembly for sealing a rotating engine shaft of the gas turbine engine of FIG. 1, the contact seal assembly including a carbon ring assembly and an associated seal runner.

Referring now to FIG. 2, at least one of the shaft seals used to seal the rotating shaft 11 and/or 13 in the engine 10 is a contact seal 20, as will now be described in further detail. The contact seal 20 includes generally a number of rotationally stationary carbon ring segments 22 which together form at least one circumferentially interrupted annular carbon ring assembly and a rotating seal runner 30 connected to one of the rotating engine shafts of the gas turbine engine 10 (such as the shaft 13 for example) and rotatable relative to the carbon ring 22. The carbon ring segments 22 are arcuate carbon segments circumferentially arranged within the seal housing 24, the housing 24 being in turn fastened in fixed position to a supporting engine support and/or casing segment 25. Further, as seen in FIG. 2, the carbon ring segments 22 may include a pair of axially spaced segmented annular carbon rings assemblies.

Referring still to FIG. 2, the annular seal runner 30 is located adjacent to and radially inwardly from the carbon ring segments 22 to thereby create a rotating contact interface between the carbon ring segments 22 and the rotating seal runner 30, to form a substantially fluid tight seal therebetween when the engine shaft 13 rotates during operation of the engine 10. More particularly, a radially outer surface 32 of the seal runner 30 contacts the radially inner surfaces 23 of the carbon ring segments 22. As will be seen, the seal runner 30 is internally cooled, in that the radially outer contact surface 32 of the seal runner does not require external spray cooling but rather is cooled from within by circulating the cooling fluid (such as, but not necessarily, oil) internally within the fluid passage 40 formed within the seal runner 30. The cooling oil is distributed to the seal runner via one or more oil nozzles 21 which feed the cooling oil radially inwardly onto the circumferentially extending open topped channel 54 disposed at a forward end 27 of the seal runner 30.

Figure 3:
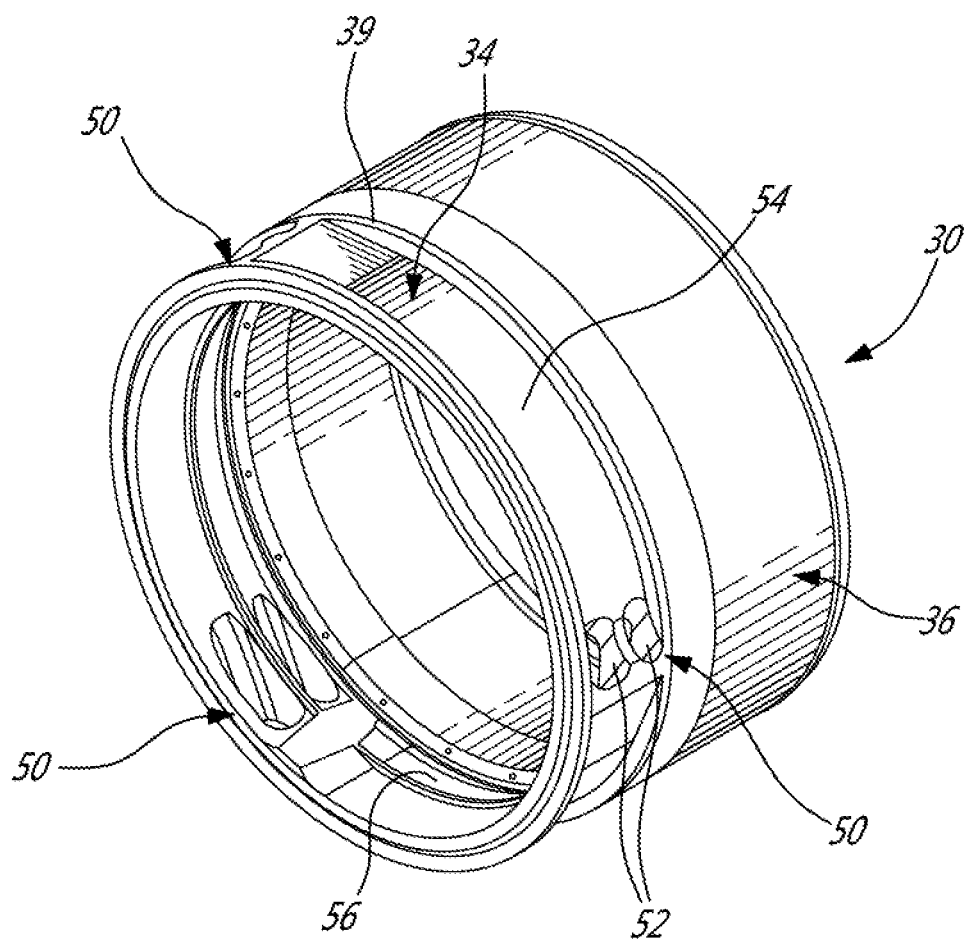
FIG. 3 is a perspective view of the seal runner of the contact seal assembly of FIG. 2.
Figure 4:
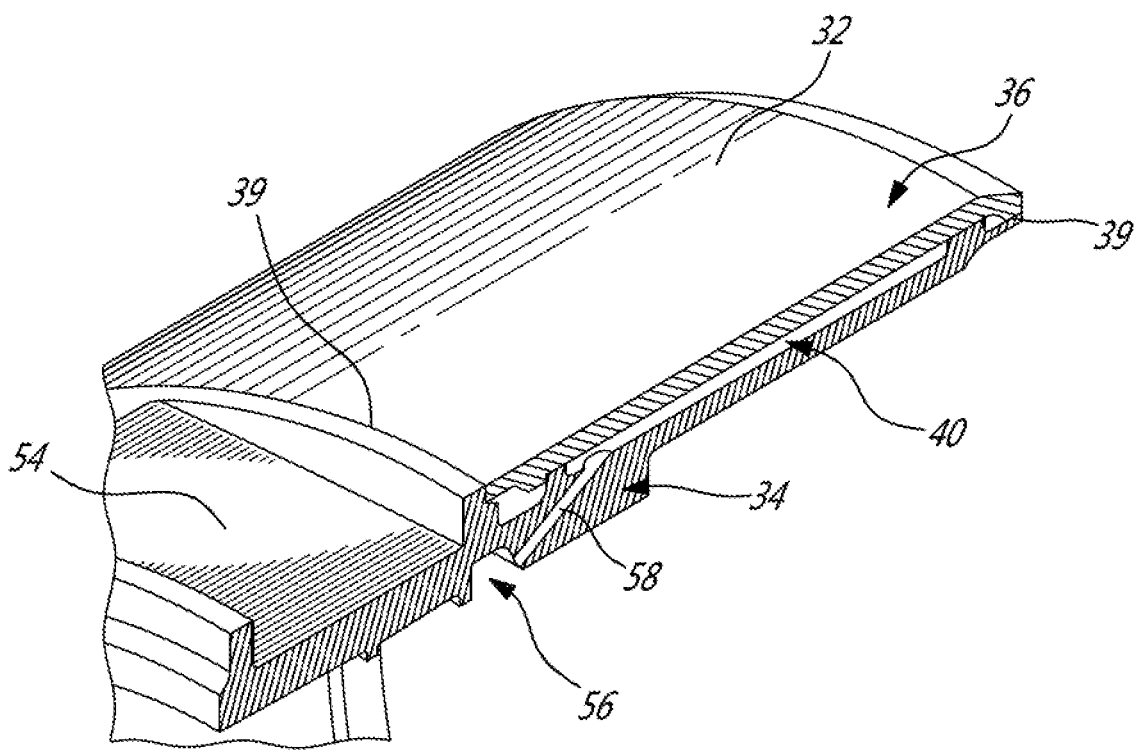
FIG. 4 is a partial cross-sectional perspective view of the seal runner of FIG. 3, taken through a fluid inlet.
Figure 5:
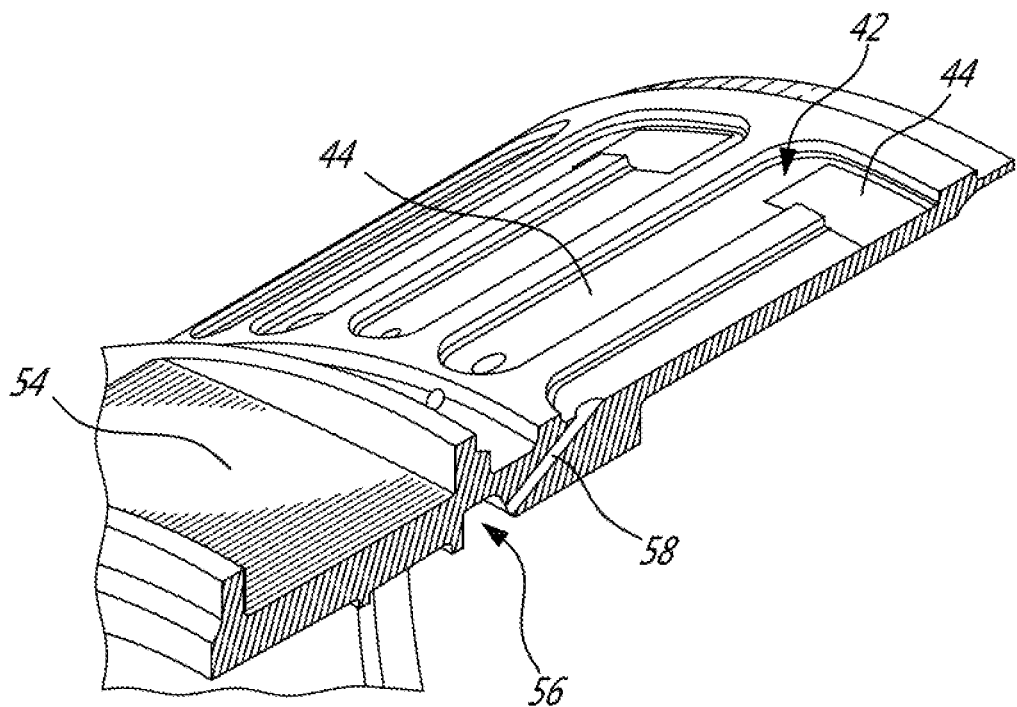
FIG. 5 is a partial cross-sectional perspective view of the seal runner of FIG. 4, shown with an outer annular portion thereof removed to depict only an inner annular portion thereof.

As seen in FIGS. 3-5, the seal runner 30 comprises first and second annular portions 34 and 36 which are concentric with one another, at least partially axially overlapping, and radially spaced apart wherein the second annular portion 36 is radially outwardly disposed from the inner first annular portion 34 such as to define an annular fluid passage 40 therebetween, as will be described further below.

The seal runner 30 may be either formed in a number of different manners, and may comprise one, two or more separate components which together form the present seal runner 30. For example, in one embodiment the seal runner 30 may be formed using a three-dimensional printing production technique, whereby the seal runner 30 is integrally formed of a single piece (i.e. is monolithic). In another possible embodiment of the present disclosure, the seal runner 30 is composed of two or more portions, which are separately formed and engaged or otherwise assembled together to form the finished seal runner 30. In this embodiment, for example, the first and second annular portions 34 and 36 are separately formed and mated together with the outer, second annular portion 36 radially outwardly spaced from the inner, first annular portion 34. The outer, or second, annular portion 36 in this case forms an outer runner sleeve which fits over the smaller diameter inner, or first, annular portion 34. The radially inner first annular portion 34 and the radially outer second annular portion 36 are, in this embodiment, separately formed and engaged together in radial superposition to form the seal runner 30, making it a two-part seal runner. More than two components may also be used to form the inner and outer annular portions 34, 36, thereby making it a multi-part seal runner. While the outer runner sleeve 36 may be engaged to the inner annular portion 34 by a number of suitable means, in at least one embodiment the two components of the seal runner 30 are welded together, for example at two axial weld points 39 (see FIGS. 4 and 7). These welds 39 may be annular, or at least extend partially about the circumference of the joints between the inner and outer portions 34, 36 of the seal runner and disposed at the forward and rearward ends of the outer sleeve portion 36. Although welds may be used to engage the components of the seal runner 30 together, other suitable engagements means may also be used, such as for example only, brazing, bonding, adhering, fastening, etc.

As noted above, at least one fluid passage 40 is radially defined between the first and second annular portions 34, 36, into which cooling oil is fed to cool the seal runner 30 in general, and the hot radially outer second annular portion 34 having the outer contact surface 32 thereon in particular. Accordingly, the fluid passage 40 is internally formed within the seal runner 30 such that the seal runner 30 is cooled from within. Cooling oil within the fluid passage 40 will be forced radially outward by centrifugal force, thereby ensuring that the cooling oil is maintained in contact with the inner surface of the hot outer sleeve portion 36, which defines the contact surface on the opposed radially outer surface for rubbing against the carbon ring segments 22. Thus, the underside of the runner surface is cooled internally, by absorbing the heat therefrom using the circulating oil flow. Further, the centrifugal force of the shaft rotating will also generate pumping of the cooling oil, using the integrated oil scoops 50 as will be described below.

Figure 6:
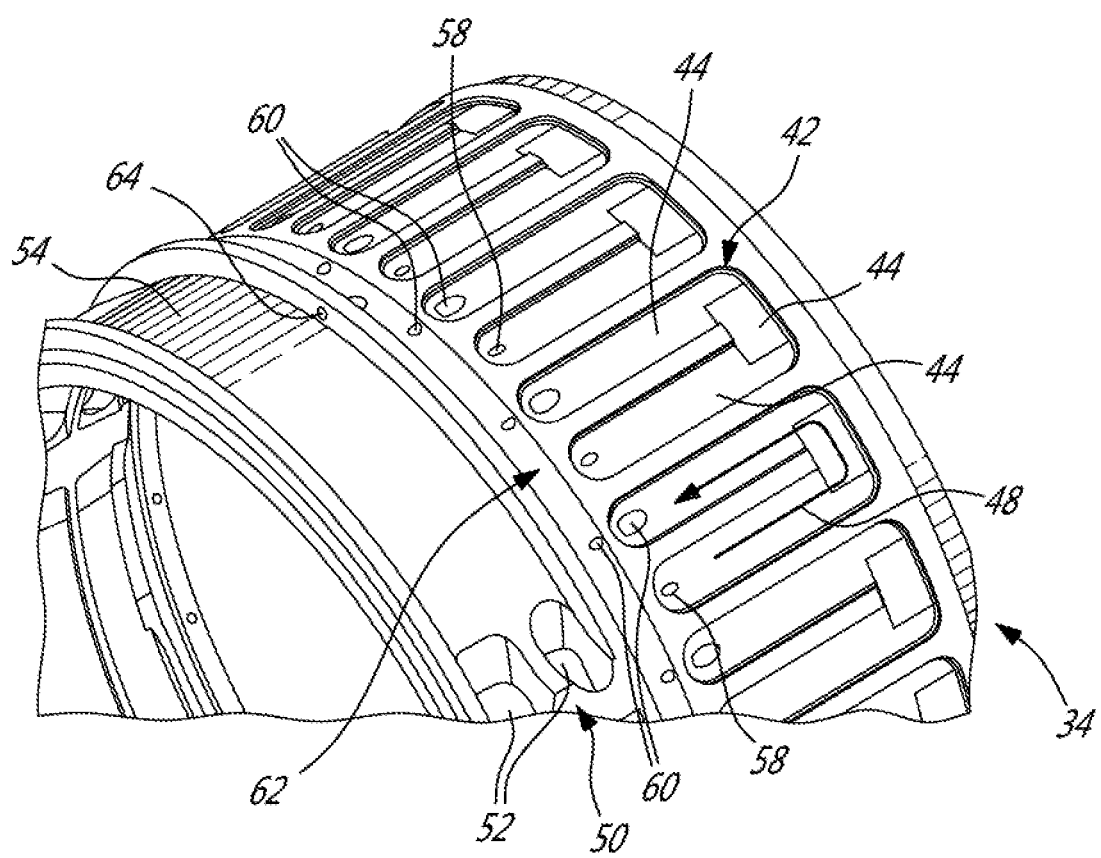
FIG. 6 is a partial perspective view of the inner annular portion of the seal runner of FIG. 5.

As best seen in FIGS. 5-6, the internal fluid passage 40 within the seal runner 30 is formed by at least one radially-open channel 42 defined in one or both of the first and second annular portions 34, 36, such as in the radially inner first annular portion 34 for example. As such, when the two annular portions 34 and 36 of the seal runner 30 are concentrically aligned and mated together, the radially inwardly facing surface of the outer second annular portion 36 encloses the open-toped channel 42 to form the enclosed fluid passage 40. The channel 42, and consequently the enclosed internal fluid passage 40, is composed of a plurality of serially interconnected passage segments 44 which intersect each other to define a tortuous fluid flow path through the fluid passage. In one particular embodiment the segments 44 of the channel 42 define a substantially serpentine shape, however other configurations and shapes of the channel(s) 42 may also be provided. In all cases, the tortuous path formed by the channel or channels 42 causes the cooling oil that is circulated through the fluid passage 40 formed by the channel 42 to more effectively cool the seal runner 30.

As seen in FIGS. 3 and 6, the seal runner 30 also includes at least one integrated oil scoop 50 that is integrally formed in the radially inner first annular portion 34 of the seal runner 30, forward of the seal runner surface 32 of the second annular sleeve portion 36. In the depicted embodiment, the seal runner 30 in fact includes three oil scoops 50 which are substantially equally circumferentially spaced apart about the inner annular portion 34 of the seal runner 30. Each of the oil scoops 50 are disposed in fluid flow communication with the internal fluid passage 40 within the seal runner 30, and more particularly the oil scoops 50 collect and feed the cooling oil into the fluid passage 40 such as to internally cool the seal runner during operation of the engine.

As seen in FIGS. 3 and 6, each of the oil scoops 50 may include a pair of openings 52 which extend radially inwardly through the first annular portion 34 of the seal runner 30 in a direction of rotation of the seal runner. The openings 52 of each of the oil scoops 50 are disposed at an angle such that rotation of the seal runner 30 causes oil within the radially open topped annular scoop channel 54 in the upstream end of the first portion 34 of the seal runner 30 to be scooped up and forced radially inwardly through the openings 52 of the oil scoops 50.

As best seen in FIGS. 4-6, cooling oil that is collected by the oil scoops 50 and forced inwardly through the scoop openings 52 is directed into an annular distribution channel 56, which is formed in the radially inner surface of the first portion 34 of the seal runner 30 and is radially inwardly open. The oil or other cooling fluid used will therefore collect in this annular distribution channel 56 during operation of the engine, as a result of the centripetal forces acting on the fluid. A plurality of angled entry holes 58 extend radially outwardly from the inner distribution channel 56, and permit fluid flow from the annular distribution channel 56 into the tortuously shaped internal fluid passage 40, formed between the first and second portions 34, 36 of the seal runner 30 as described above.

Figure 9:
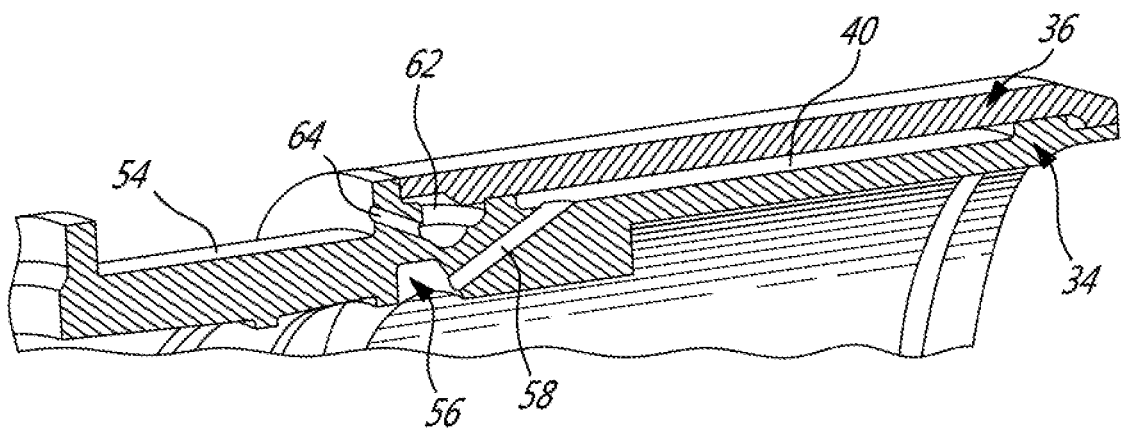
FIG. 9 is a partial cross-sectional view of the seal runner, taken through both the fluid inlet and a fluid exit.

Referring briefly to FIG. 9, the entry holes 58 may, in one possible embodiment, permit greater fluid flow therethrough than do the exit holes 64. This may be accomplished, for example, by forming the entry holes 58 having greater diameters than the diameters of the exit holes 64. Alternately or in addition, there may be substantially more entry holes 58 provided than exit holes 64. The fluid flow rate through the seal runner 30 is therefore able to be controlled as desired, by selecting the number, configuration and geometry of the entry and exit holes or openings. In one particular embodiment, more than 6 times the number of entry holes than exit holes are provided, and the diameter of the inlet holes is greater than that of the exit holes, for example each of the exit holes is less than ¾ the diameter of each of the inlet holes.

Figure 7:
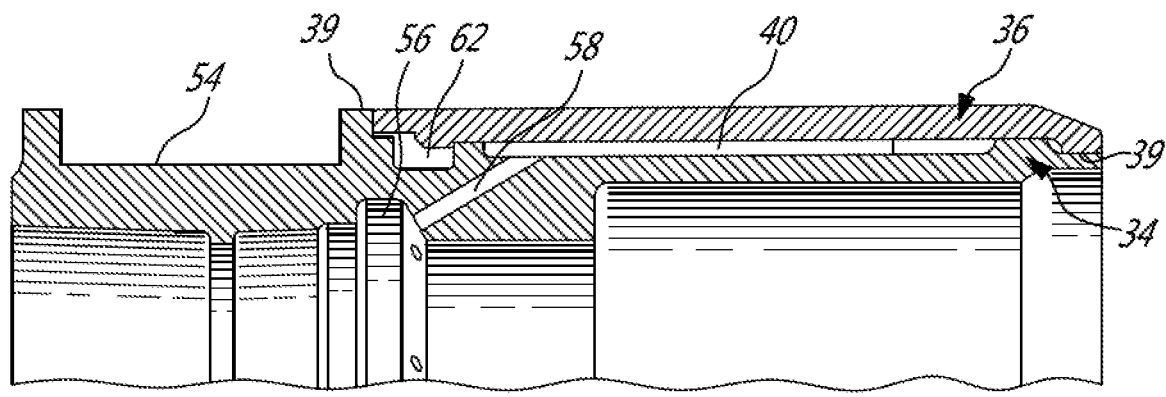
FIG. 7 is a partial cross-sectional view of the seal runner of FIG. 4.
Figure 8:
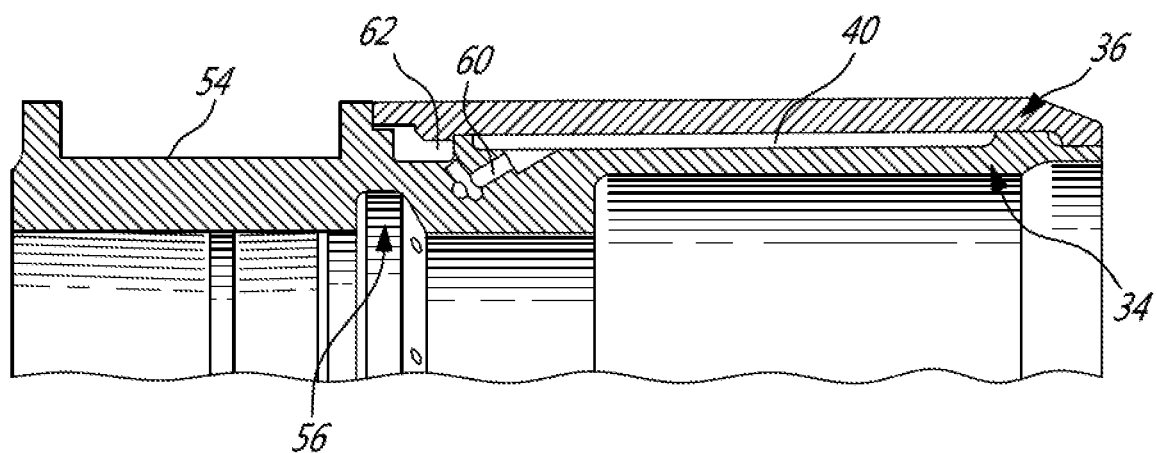
FIG. 8 is a partial cross-sectional view of the seal runner, taken through a fluid exit from the internal seal runner fluid passage.
Figure 10:
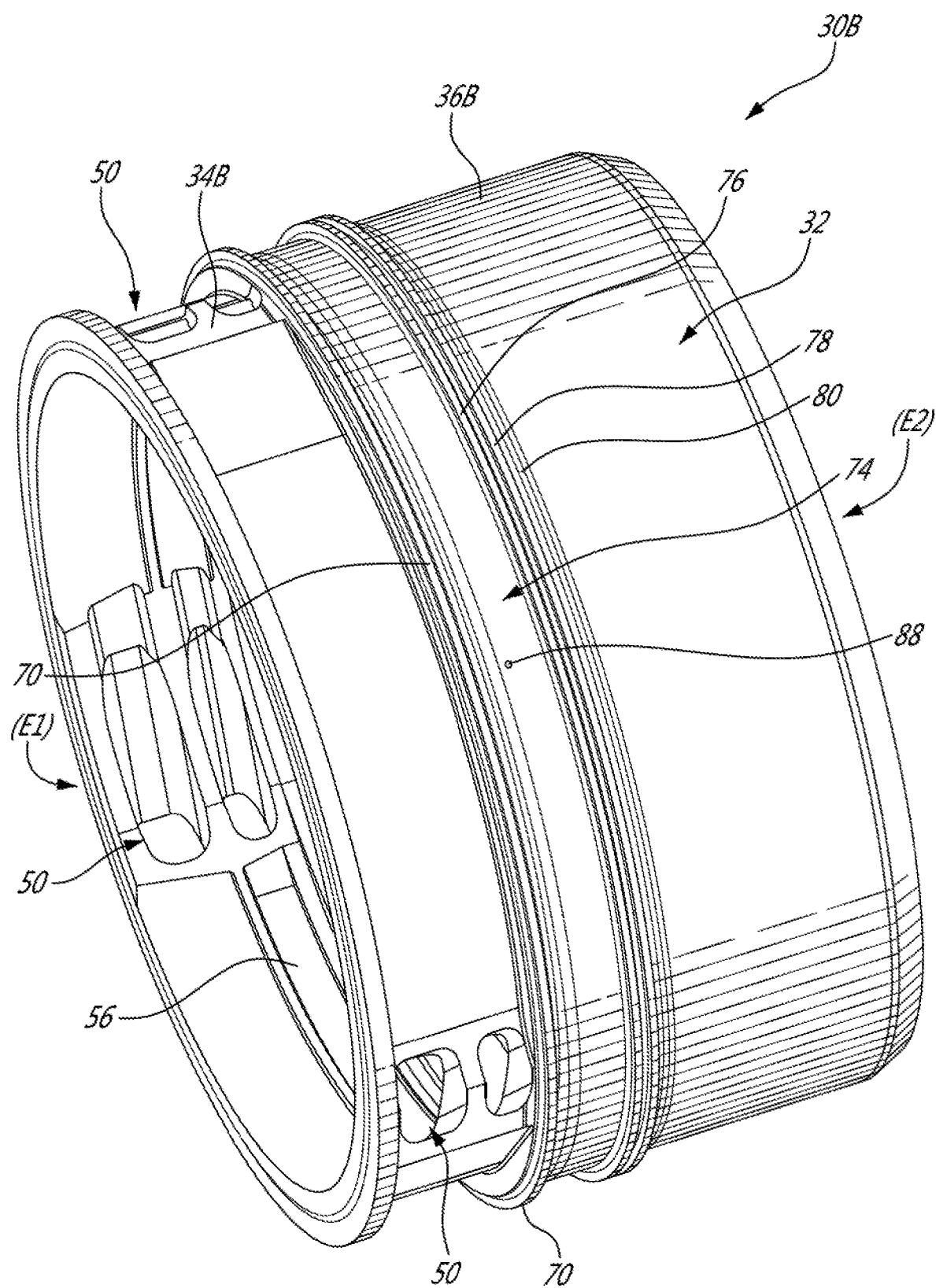
FIG. 10 is a perspective view of a seal runner of a contact seal assembly for sealing a rotating engine shaft of the gas turbine engine of FIG. 1, the seal runner of the contact seal assembly being according to a different embodiment.

As can be seen in FIGS. 7-9, while the internal fluid passage 40 of the seal runner 30 may have a tortuous flow path as shown in FIGS. 7-8, the fluid passage 40 is axially elongated and extends axially between the inner and outer portions 34, 36 of the seal runner 30 along at least a major portion of the axially overlapping length between the inner and outer portions 34 and 36. The entire fluid passage 40 is accordingly annular in shape, extending circumferentially about the seal runner 30 between the inner and outer portions 34 and 36 thereof. When seen in cross-section as shown in FIGS. 9-11, the fluid passage 40 may axially extend in a direction that is substantially parallel to, and concentric with, an axis of rotation 15 of the engine shaft 13 and thus the axis of rotation of the annular seal runner 30 that is fixed to the shaft.

Once the cooling fluid (ex: oil, or otherwise) enters the internal fluid passage of the seal runner 30 via the entry holes 58 as described above, the cooling fluid then flows through the tortuous flow path 48 as shown in FIG. 8, i.e. through the serially connected serpentine channel segments 44 which make up the channel 42. This flow of cooling fluid through the internal fluid passage 40 according acts to cool the seal runner 30 from the inside, thereby cooling the hotter outer portion 36 of the rotating seal runner 30 having the radially outer surface 32 thereon which defines the rubbing contact interface with the carbon ring segments 22 of the contact seal assembly 20. This internal cooling of the seal runner 30 may therefore avoid the need for external spray cooling, thereby simplifying the cooling oil nozzle placement and enabling a more compact contact seal assembly 20.

As seen in FIGS. 6 and 8, once the cooling fluid has circulated through the internal fluid passage 40 along the tortuous flow path 48 therewithin, the fluid exits the fluid passage 40 via exit passages 60 which communicate with an radially outwardly opening channel 62 formed in the outer surface of the first annular portion 34 of the seal runner 30. Cooling fluid within this annular channel 62 is then able to circumferentially circulate between the inner and outer portions 34, 36 of the seal runner 30 thereby providing further cooling prior to being ejected out from between the two portions 34, 36 of the seal runner 30, and back into the open channel 43 for subsequent recirculation, via outlet holes 64 (see FIGS. 6 and 9).

The contact seal assembly as described herein is believed to provide an improved shaft seal adapted for use in a gas turbine engine, however the present contact seal may also be used for other shaft sealing applications. For example only, high speed pumps and compressors used in high speed, high temperature and/or severe service conditions represent other applications in which the present rotating shaft seal may prove viable. The present contact seal and seal runner may be particularly useful in applications when space is limited and/or enables the seal runner to be cooled even when there is no access to the underside of the seal runner directly. Thus, cooling fluid nozzles and related configurations may be able to be simplified, thereby potentially saving space, weight and/or cost.

When used in a gas turbine engine 10 such as that depicted in FIG. 1, the present contact seal assembly 20 may be disposed about any rotating shaft or other element thereof, such as for example about at least one of the main engine shafts 11 and 13. Alternately, the contact seal assembly 20 may be employed to seal another rotating shaft in the gas turbine engine 10 or in another turbomachine, pump, compressor, turbocharger or the like. The seal runner 30 of the present contact seal assembly 20 preferably integrally formed therewith. The seal runner 30 may be mounted to the shaft using any suitable means, such as by using a threaded stack nut 29 which fastens the seal runner in place about the shaft 13, as shown in FIG. 2. Regardless, the seal runner 30 is rotationally fixed in place to the shaft 13, such that it rotates within the carbon ring segments 22 and remains in contact therewith when the shaft 13 rotates. Thus, the contact seal assembly 20 provides a fluid seal about the rotating shaft.

Now referring to FIGS. 10 to 13, a seal runner 30B, which is another embodiment of the seal runner 30, used in a contact seal assembly 20B, which is another embodiment of the contact seal assembly 20 described above, are shown. The seal runner 30B and the contact seal assembly 20B may include some of the features of the seal runner 30 and the contact seal assembly 20, respectively. Such features have been shown with the same reference numerals as were used with respect to the seal runner 30 and the contact seal assembly 20, respectively, and will not be described in detail again.

Elements of the seal runner 30B and the contact seal assembly 20B that have at least some of the features of similar elements and/or functionality of the seal runner 30 and the contact seal assembly 20, respectively, but which differ in at least some respects, have been labeled with similar or the same names but given the reference numerals of the similar elements with a suffix 'B' added thereto. Differences with respect to the 'B'-series elements are described in detail herein next.

To avoid repetition, aspects, features and functionality of the 'B'-series elements that may be the same as the aspects, features and functionality of the corresponding elements of the seal runner 30 and the contact seal assembly 20 described above are not described again herein. At least some elements of the seal runner 30B and the contact seal assembly 20B that were not present in the seal runner 30 and the contact seal assembly 20 are given new reference numerals herein next.

A difference between the seal runner 30B and the seal runner 30 is that the seal runner 30B includes, in series and in an order from a first end (E1) of the seal runner 30B toward a second end (E2) of the seal runner 30B: a first slinger 70, a circumferentially extending oil collector groove 72, a radially outward outlet surface 74 extending axially from the oil collector groove 72 to a second slinger 76, a third slinger 78, and a circumferentially extending gutter 80.

The slingers 70, 76, 78 in this embodiment are defined by respective flanges that extend radially outward from the axially adjacent respective surfaces of the seal runner 30B. In the present embodiment, the first slinger 70 is defined by the annular portion 34B of the seal runner 30B, and the second and third slingers 76, 78 are defined by the annular portion 36B. In other embodiments, the slingers 70, 76, 78 may be defined by different ones of the annular portions 34B, 36B of the seal runner 30B.

Figure 11A:
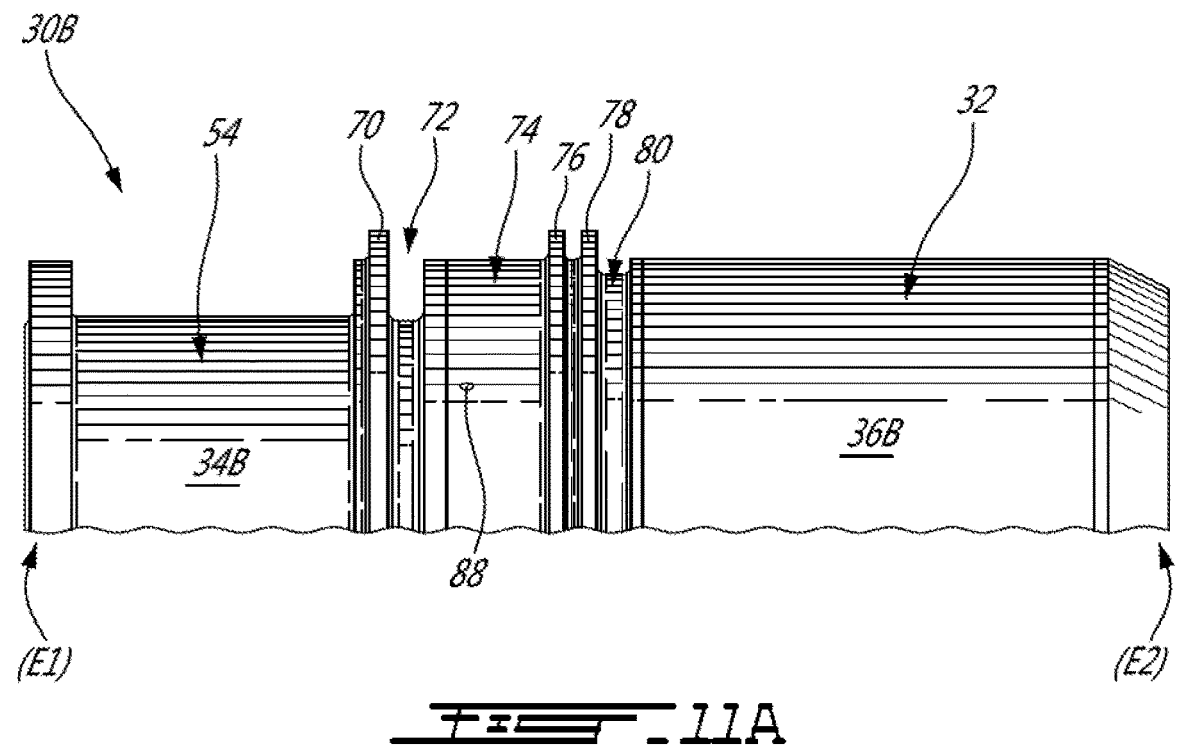
FIG. 11A is a partial side elevation view of the seal runner of FIG. 10.
Figure 11B:
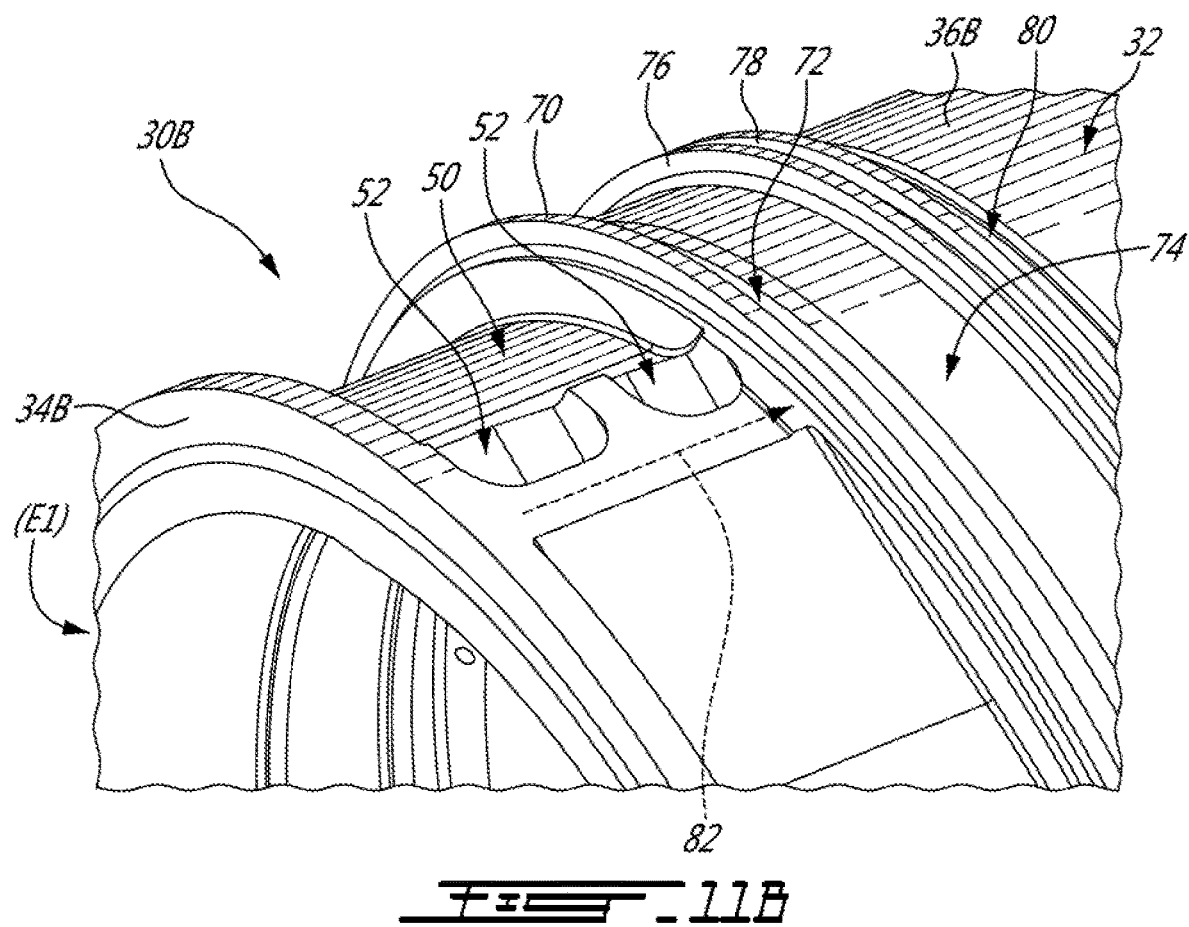
FIG. 11B is a close-up perspective view of a part of the seal runner of FIG. 10.

As best shown in FIG. 11A, the first slinger 70 extends radially outward from the surface(s) of the seal runner 30B defining the open topped channel 54 and from the surface(s) of the seal runner 30B defining the oil collector groove 72. In the present embodiment, the first slinger 70 extends radially outward from these surfaces along an entirety of the circumference of the seal runner 30B and thereby creates a "360-degree" fluid barrier to axial flow of fluid between these surfaces, which in this non-limiting embodiment are the surface(s) of the seal runner 30B defining the open topped channel 54 and the surface(s) of the seal runner 30B defining the oil collector groove 72. In use, and as shown in FIG. 11B, the "360-degree" fluid barrier created by the first slinger 70 may prevent or at least reduce a flow such as the one shown with arrow 82. To this end, in the present embodiment, the first slinger 70 is approximately 0.050" wide by 0.080" tall, but a differently dimensioned slinger could be used depending on surrounding hardware and space limitations.

In the present embodiment, the second and third slingers 76, 78 similarly each extend radially outward from respective axially adjacent surfaces of the seal runner 30B along an entirety of the circumference of the seal runner 30B. The second and third slingers 76, 78 thereby create a "360-degree" fluid barrier to axial flow of fluid between these surfaces, which in this non-limiting embodiment are the surface(s) of the seal runner 30B defining the outlet surface 74 and the surface(s) of the seal runner 30B defining the gutter 80. In some embodiments, a different number of the slingers 76, 78 could be used, such as a single one of the slingers 76, 78 or more than the two slingers 76, 78.

Referring to FIGS. 10, 11A, and 11B, in this embodiment, the oil collector groove 72 is disposed axially in between the first slinger 70 and the outlet surface 74 and second slinger 76. In another aspect, the oil collector groove 72 is disposed axially in between the oil scoops 50 and the radially outer surface 32 (a.k.a. "seal runner surface 32") of the seal runner 30B. oil collector groove to disconnect the scoop from the runner. A function of the oil collector groove 72 is to collect coolant, such as oil for example, that may drip onto the outlet surface 74 when the seal runner 30B is in use. The oil collector groove 72 helps direct collected coolant away from the seal runner surface 32, and hence away from the carbon ring segment(s)/seal(s) 22 that may be disposed adjacent to and radially outwardly from the seal runner surface 32. In the present embodiment, the oil collector groove 72 is approximately 0.170" deep by 0.100" wide, but different dimensioning, such as for example a larger and deeper oil collector groove 72, may be used depending on surrounding hardware and space limitations.

Another difference between the seal runner 30B and the seal runner 30 is that instead of the radial exit passages 60, the seal runner 30B defines axially extending exit slots 60B in the respective parts of the channels 42B defined by the serially connected serpentine channel segments 44. Accordingly, in this embodiment and as shown with arrow 84 in FIG. 12, a flow of a cooling fluid when exiting a given channel 42B exits the given channel 42B axially into a circumferentially extending outlet groove 86. In this embodiment, and although need not be the case in other embodiments, the outlet groove 86 is defined by and in the radially inner annular portion 34B.

In turn, in this embodiment the radially outer portion 36B defines one or more, and in this embodiment multiple, outlets 88 extending radially therethrough to fluidly connect a radially outer surface of the seal runner 30B (in this embodiment, the outlet surface 74) to the outlet groove 86. Hence, coolant from the outlet groove 86 may exit the seal runner 30B via the outlets 88 that may be circumferentially distributed along and defined through the outlet surface 74 as shown in FIG. 13. Coolant exiting the outlets 88 may then flow for further circulation, such as for example for additional subsequent passes through the fluid passage(s) 40B/44 etc of the seal runner 30B by for example being after some time re-ingested by the scoops 50. Since it is contemplated that a coolant other than oil may be used in some embodiments and/or applications of the contact seal assembly 20B and/or the seal runner 30B, the scoops 50 more generally may be referred to as coolant scoops 50.

In an aspect, the axially extending exit slots 60B and-or the fluidly subsequent radially outwardly extending outlets 88 may take advantage of centrifugal forces to help reduce accumulation of debris and dust that may otherwise occur over time within the channels 42B of the seal runner 30B. In other embodiments, a different type of fluid passage may be used instead of the exit slots 60B, while providing at least some of similar advantages. In some such embodiments, for providing at least some of similar advantages, the fluid passage(s) may be shaped so as to have no radially inward or radially outward apex.

As an example, a radially inward apex may be defined as shown in FIG. 8, by a passage extending radially inwardly to the apex and thereafter extending radially outwardly toward an outlet. Conversely, as another example, a radially outward apex may be defined by a mirror of the passage 60 arrangement shown in FIG. 8, such as by a passage extending radially outwardly to the apex and thereafter extending radially inwardly from the apex toward an outlet.

Now referring to FIG. 13, the seal runner 30B is shown as being used in a contact seal assembly 20B, which is another embodiment of the contact seal assembly 20 described above. The contact seal assembly 20B includes some of the features of the contact seal assembly 20. Such features have been shown with the same reference numerals as were used with respect to the contact seal assembly 20, and will not be described in detail again.

As shown in FIG. 13, a difference between the contact seal assembly 20B and the contact seal assembly 20 is that the seal housing 24B of the contact seal assembly 20B includes a projection 90 that extends axially (i.e. in an axial direction) away from the carbon ring segment(s)/seal(s) 22 toward the first end (E1)/the scoops 50 of the seal runner 30B, and terminates past the slinger 78 and/or 76 at a an axial end 90E thereof. In this embodiment, the projection 90 is dimensioned such that the axial end 90E thereof is disposed axially between the oil collector groove 72 and the slinger 76.

A radially inward surface 90A of the projection 90 and radially opposite outer surfaces of the seal runner 30B define a coolant collector cavity 92 therebetween. In this particular non-limiting embodiment, the radially opposite outer surfaces of the seal runner 30B include surfaces of the seal runner 30B defining the slingers 76, 78, the gutter 80, a part of the outlet surface 74, and a part of the seal runner surface 32. As shown, the coolant collector cavity 92 is disposed above the second and third slingers 76, 78.

As shown, the radially inward surface 90A of the projection 90, and hence the coolant collector cavity 92, is tapered such that it slopes radially outward in a direction away from the carbon ring segment(s)/seal(s) 22. In an aspect, this taper/slope helps take advantage of centrifugal forces that may be generated by rotation of the seal runner 30B and the shaft 13 about the rotation axis of the shaft 13, and which may act on coolant, such as oil, that may enter the coolant collector cavity 92. More particularly, the radially inward surface 90A, and hence the coolant collector cavity 92, may help direct the coolant along the radially inward surface 90A away from the carbon ring segment(s)/seal(s) 22.

To this end, the positioning of the slingers 76, 78 under the radially inward surface 90A of the projection 90 may allow the slingers 76, 78 to sling radially outward, depending on the centrifugal forces in different in-use conditions, coolant that may come into contact with the slingers 76, 78, toward the radially inward surface 90A. The slung-out coolant that reaches the radially inward surface 90A from one or both of the slingers 76, 78 may flow, via its gained inertia for example, along the radially inward surface 90A away from the carbon ring segment(s)/seal(s) 22.

In this embodiment, coolant flowing along the radially inward surface 90A away from the carbon ring segment(s)/seal(s) 22 may flow into a cavity 94 that may be defined around the seal runner 30B and which may be in fluid communication with the coolant collector cavity 92 as shown in FIG. 13. In this embodiment, the cavity 94 may be a cavity of the engine 10 that contains, for example, the one or more oil nozzles 21 described above, the seal runner 30B, the shaft 13, and the projection 90. The cavity 94 may be defined at least in part by the seal housing 24B. In some embodiments, and depending on which shaft(s) the contact seal assembly 20B and the seal runner 30B are used with, the cavity 94 may be a different one or more cavities.

Still referring to FIG. 13, in some embodiments, the radially inward surface 90A of the projection 90 may define a separation wall 90B that may be disposed in an upper portion of the coolant collector cavity 92 as shown. Where present, the separation wall 90B may be disposed radially opposite to/over the slinger 78 as shown, and/or over the slinger 76. The separation wall 90B may extend toward the respective one(s) of the slingers 76, 78 to define a gap 90B' therewith. In an aspect, the separation wall 90B may help keep coolant, such as oil, that may be deflected/slung by the slinger(s) 76, 78 away from the carbon ring segment(s)/seal(s) 22. In some embodiments, the gap 90B' may be sized sufficiently small to act as a proximity seal while providing substantially zero friction between the separation wall 90B and the respective slinger(s) 76, 78 in at least some, and in some embodiments in all normal operating conditions.

As shown in FIG. 13, in some embodiments, the projection 90 further defines an external gutter 90C in a radially outward surface thereof. As shown, the external gutter 90C covers the slingers 76, 78, the gutter 80, and the contact surface 32. In this embodiment and although not necessarily the case in other embodiments, the external gutter 90C also covers a part of the outlet surface 74. In use, the external gutter 90C may catch coolant dripping down in the cavity 94 at locations from which the coolant may, but-for the external gutter 90C, drip into the gutter 80 and/or on the contact surface 32 between the carbon ring segment(s)/seal(s) 22 and the gutter 80. Where present, the external gutter 90C may thus help keep coolant away from the carbon ring segment(s)/seal(s) 22, and may therefore help reduce or prevent leakage of coolant out of the contact seal assembly 20B via the interface between the carbon ring segment(s)/seal(s) 22 and the contact surface 32 of the seal runner 30B in at least some operating conditions.

Still referring to FIG. 13, in at least some applications, such as for example the engine 10 application described herein, at least some of the stationary (i.e. non-rotating relative to the rotation axis 15 for example) components of the engine 10 and/or of the contact seal assembly 20B, such as for example the carbon ring segment(s)/seal(s) 22 and/or the seal housing 24B, may experience thermal growth with changing operating conditions. In some cases, as a result of thermal growth during changing operating conditions representative of an entirety of an operating envelope of the contact seal assembly 20B, at least some of the stationary (i.e. non-rotating relative to the rotation axis 15 for example) components of the engine 10 and/or of the contact seal assembly 20B may move axially through a range of axial displacements (AD), relative to at least some of the rotational components (e.g. the seal runner 30B), in a direction from the first slinger 70 toward the second slinger 76.

A given engine 10 and/or contact seal assembly 20B may experience a given maximum of such axial displacement (AD) through an entirety of an operating envelope for which the contact seal assembly 20B may be designed. In some such cases and embodiments, as shown with axial distances (D1) and (D2) in FIG. 13, the slinger(s) 76, 78 may be axially positioned relative to the outer end of the projection 90 and relative to a rest of the seal runner 30B such that in any given axial displacement, including a maximum design axial displacement (AD), the slingers 76, 78 remain covered by the projection 90. The slingers 76, 78 may thus continue slinging coolant in a direction away from the carbon ring segment(s)/seal(s) 22 and in this embodiment at the radially inward surface 90A for continued movement of coolant along the radially inward surface 90A in a direction away from the carbon ring segment(s)/seal(s) 22.

As shown in FIG. 13, in the present embodiment the projection 90 defines the axial distance (D1) between the axial end 90E of the projection 90 and a transverse side 76' of the second slinger 76 that faces toward the ring segment(s)/seal(s) 22. Also as shown in FIG. 13, in the present embodiment the projection 90 defines the axial distance (D2) between the axial end 90E of the projection 90 and a transverse side 78' of the third slinger 78 that faces toward the ring segment(s)/seal(s) 22. For the purposes of this document, the term "transverse" is used in relation to the rotation axis of the shaft, in this embodiment the axis 15 and the shaft 13, with respect to which the contact seal assembly 20B and the seal runner 30B may be used.

As can be seen in FIG. 13, the slingers 76, 78 are positioned that such that any potential axial displacement (AD) will move the slingers 76, 78 in a direction away from the ring segment(s)/seal(s) 22, toward the axially outer portion 92' of the coolant collector cavity 92. Hence, in such axially displaced positions the slingers 76, 78 may sling coolant at respective locations that will be farther from the ring segment(s)/seal(s) 22 in comparison with the current non-axially-displaced locations in which the slingers 76, 78 are shown in FIG. 13. In some axially displaced positions, the slingers 76, 78 may align with and thus sling coolant into the axially outer portion 92' of the coolant collector cavity 92.

In this embodiment, a range of axial displacements (AD) that may result from possible thermal growth during varying operating conditions may therefore help keep coolant that may contact the radially outward surfaces of the seal runner 30B further away from the ring segment(s)/seal(s) 22. The positioning selected by dimensioning the projection 90 and/or the slingers 76, 78 to provide the axial distances (D1) and (D2) as described herein may therefore help reduce or prevent leakage of coolant out of the contact seal assembly 20B via the interface between the carbon ring segment(s)/seal(s) 22 and the contact surface 32 of the seal runner 30B in at least some operating conditions, such as during engine 10 start-up and/or motoring for example.

In a more particular embodiment, the distances (D1) and (D2) may be selected so as to be positive throughout the range of axial displacements (AD) that may result from a change of operating conditions across an entirety of the operational envelope for which the contact seal assembly 20B may be designed. An additional advantage of such an embodiment is that in all axial displacements (AD), and coolant that may drip onto the seal runner 30B from the projection 90 will always land short of the slinger 76, somewhere on the outlet surface 74 between the slinger 76 and the oil collector groove 72.

To this end, in the present embodiment (D1) is 0.060", but may be different in other embodiments depending on the engine components axial tolerance stack-up for example. Hence, at least some coolant that may flow onto the radially inward surface 90A defining the axially outer portion 92' of the coolant collector cavity 92 and into the oil collector groove 72 may be slung back into the cavity 94 by the radially inward surface 90A and the oil collector groove 72 at some rotating speeds of the seal runner 30B.

Further in the present embodiment, (D2) may be selected such that the slinger 78 is positioned relative to a rest of the seal runner 30B such that the gutter 80 remains under, and hence covered by, the projection 90 in all axial displacements (AD) that may occur during use. In an aspect, this may help reduce or prevent coolant from falling onto the gutter 80 in extreme axial tolerance stack-up conditions or in a maximum thermal growth condition in which the axial displacement (AD) of the static components may be at its maximum. In the present embodiment, (D2) is approximately 0.190", but may be different depending on engine components dimensional tolerance stack-up and engine thermal growth. In use, the gutter 80 may interrupt coolant escaping the cavity(ies) between the slingers 76, 78 and moving toward the carbon ring segment(s)/seal(s) 22, and may help sling this coolant back into the cavity 94 via the radially inward surface 90A.

Figure 14:
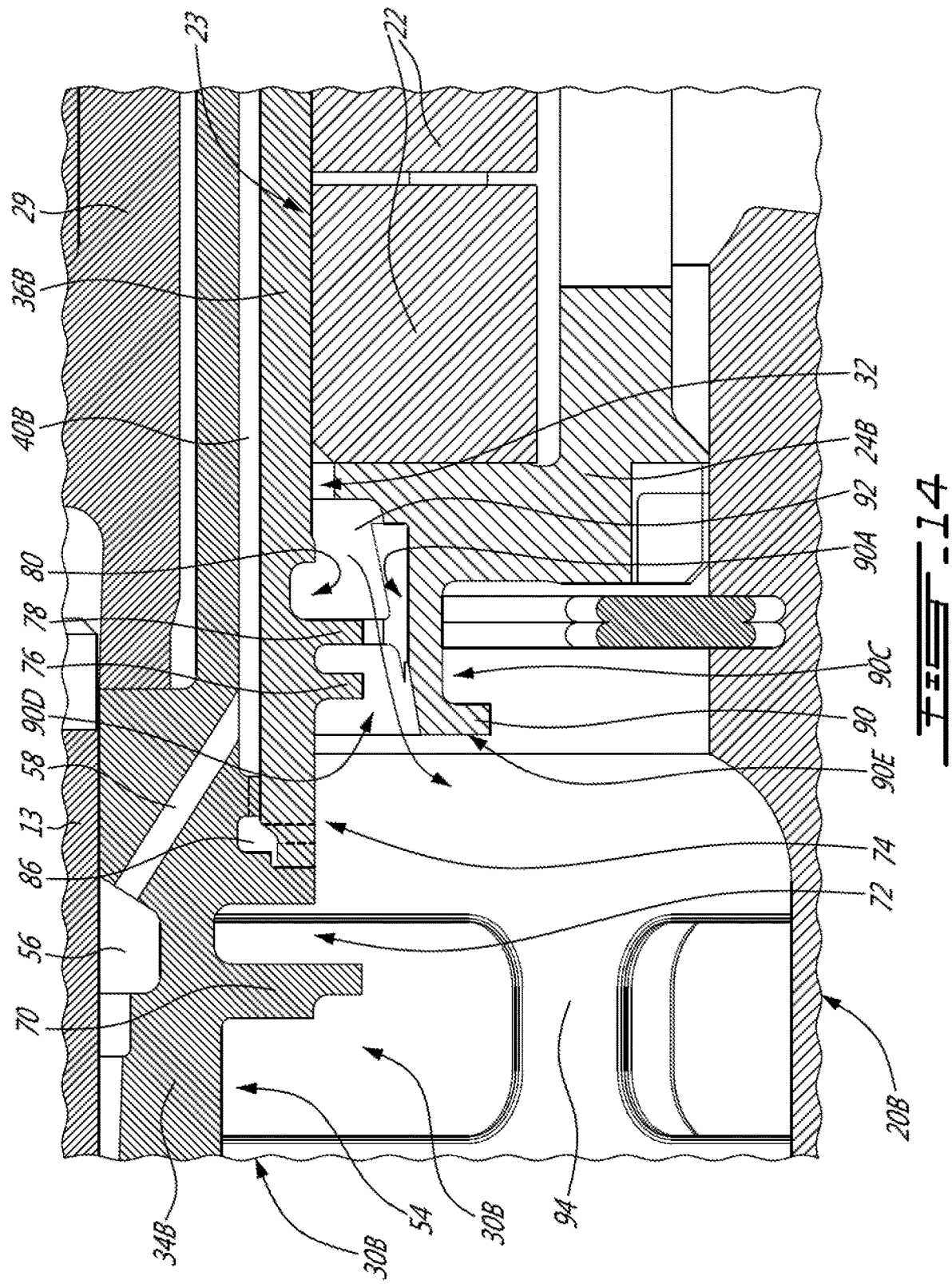
FIG. 14 is a cross-sectional view of a lower part of the contact seal assembly and the seal runner of FIG. 10.

Referring now to FIG. 14, in the present embodiment and although not necessarily the case in other embodiments, the projection 90, and hence the coolant collector cavity 92, extends circumferentially about an entirety (i.e. about 360 degrees) of the seal runner 30B, radially outwardly of the seal runner 30B. As shown in FIG. 14, the projection 90 may define a gravity drain 90D in a bottom portion of the coolant collector cavity 92. The drain 90D may fluidly connect the bottom portion of the coolant collector cavity 92 to the cavity 94 defined by the seal housing 24B.

The drain 90D may help move coolant that may make its way toward the carbon ring segment(s)/seal(s) 22 past the slingers 76, 78 back into the cavity 94 via gravity in at least some operating conditions. To this end, the drain 90D, which in this embodiment is defined by a respective part of the radially inward surface 90A of the projection 90 may be sloped downward to allow for the gravity drainage at least when the engine 10 is attached to an aircraft and the aircraft is stationary on flat horizontal terrain and/or executing a cruise segment.

The features of the contact seal assembly 20B described above as helping to keep and/or move coolant, such as oil in the present embodiment, away from the carbon ring segment(s)/seal(s) 22, are examples of coolant restricting features. It is contemplated that the contact seal assembly 20B may have other coolant restricting features, one or more of which may include a combination of at least some of the coolant restricting features described above.

Figure 15:
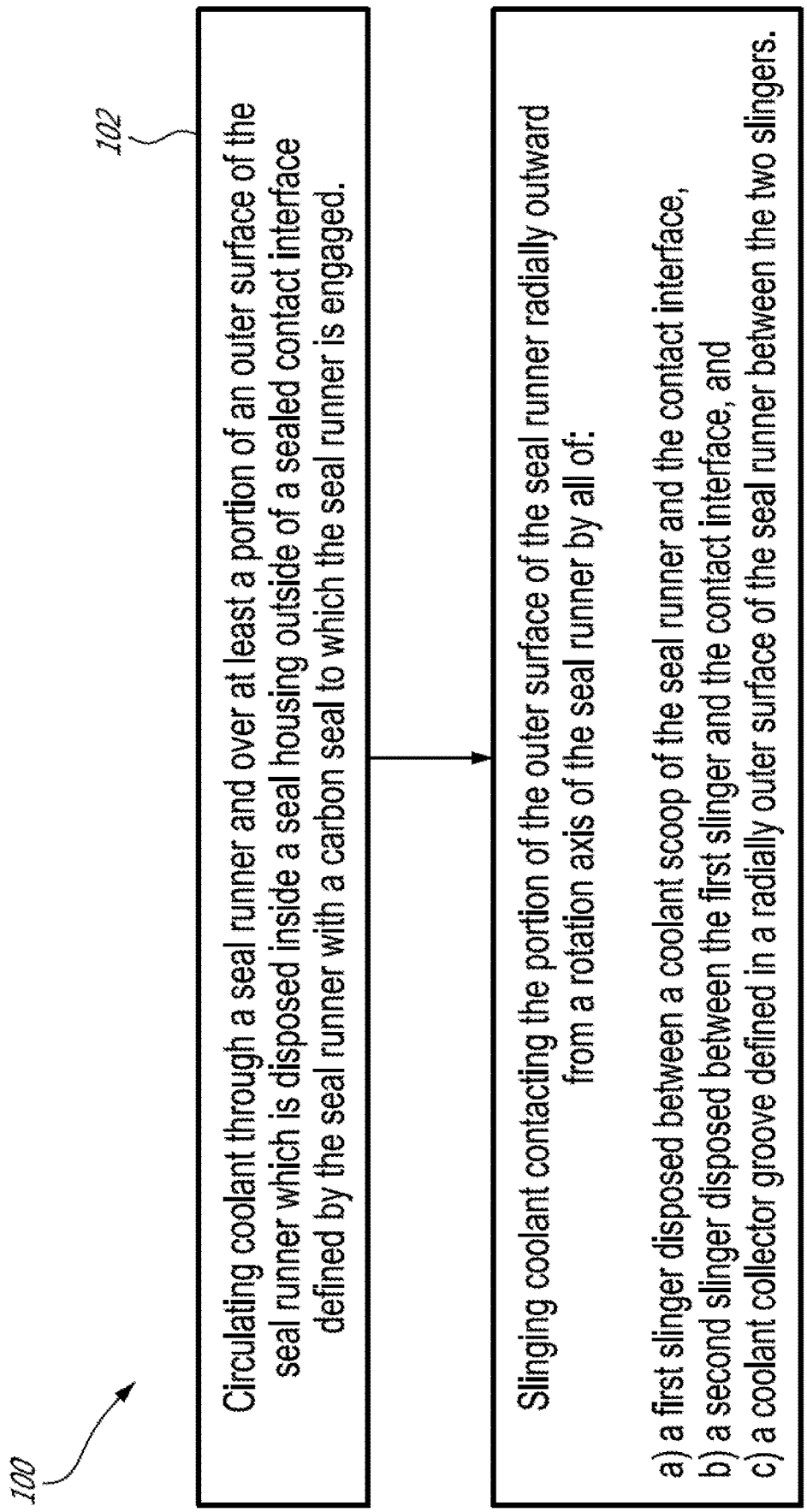
FIG. 15 is a diagram showing a method of cooling an annular seal runner.

Now referring to FIGS. 13 and 15, the present technology also provides a method 100 of cooling an annular seal runner 30B engaged to a shaft 13 and being part of a contact seal assembly 20B received at least in part in a seal housing 24B and having a carbon seal 22 secured to the seal housing 24B, the carbon seal 22 abutting the seal runner 30B during relative rotation between the seal runner 30B and the carbon seal 22 to form a contact interface 23 between an outer runner surface 32 of the seal runner 30B and an inner surface 22' of the carbon seal 22 to form a fluid seal around the shaft 13.

In some embodiments, the method 97 may include a step 102 of circulating a coolant through the seal runner 30B. As an example, this step 102 may be performed by circulating oil from the engine 10 as shown schematically with arrows 101 in FIG. 13, the lines 101 showing flow through the various internal flow paths of the seal runner 30B. The step 102 of circulating the coolant may also include circulating coolant over at least a portion of an outer surface of the seal runner 30B that is disposed inside the seal housing 24B outside of the contact interface 23. As seen above, in some non-limiting embodiments, said outer surface of the seal runner 30 may include the surface(s) defining the open topped channel 54, the first slinger 70, the coolant collector groove 72, and the outlet surface 74.

The method may also include a step 104 of slinging at least some of the coolant contacting the portion of the outer surface of the seal runner 30B (in a direction that is) radially away from the outer surface by at least all of: a first slinger 70 disposed axially between a coolant scoop 50 of the seal runner 30B and the contact interface 23, a second slinger 76 disposed axially between the first slinger 70 and the contact interface 23, and a coolant collector groove 72 defined in a radially outer surface of the seal runner 30B axially between the first slinger 70 and the second slinger 76.

Step 102 may be performed by, for example, sufficiently quickly rotating the seal runner 30B, and hence all of the first and second slingers 70, 76, and the coolant collector groove 72, relative to the seal housing 24B about the rotation axis 15 of the associated shaft 13. As an example, FIG. 12 shows the radially-away direction with a straight arrow showing oil exiting one of the outlets 88. In an aspect, the method 100 of cooling an annular seal runner 30B may help reduce or prevent leakage of coolant out of the associated contact seal assembly 20B via the sealed interface 23 in at least some operating conditions.

The above description is meant to be exemplary only, and one skilled in the art will recognize that changes may be made to the embodiments described without department from the scope of the technology disclosed. For example, while the contact seal assembly 20B has been described above as having a particular set of features, in other embodiments the contact seal assembly 20B need not have all of these features. As another example, while each given contact seal assembly 20 and 20B has been described above as having a particular set of features, in other embodiments a contact seal assembly implemented according to the present technology may have a combination of one or more of the features of the contact seal assembly 20 and one or more of the features of the contact seal assembly 20B.

As yet another example, while some features of the seal runner 30B in the embodiments above are defined by one of the annular portions 34B, 36B of the seal runner 30B, in other embodiments one or more of the features may be defined by another one, or in part by each of, the annular portions 34B, 36B. As yet another example, while some features of the seal runner 30B in the embodiments above may be defined by both of the annular portions 34B, 36B of the seal runner 30B, in other embodiments one or more of the features may be defined by only one of the annular portions 34B, 36B. As yet another example, the seal runner 30B with its various possible features may be manufactured as a single-piece part using a conventional 3-dimensional printing/manufacturing technique and suitable conventional materials for example.

As yet another example, the number and arrangement of the carbon ring segment(s)/seal(s) 22 may be different in each given embodiment and application of the contact seal assembly 20B and/or the seal runner 30B. Thus, the carbon ring segment(s)/seal(s) 22 more broadly may be referred to as a carbon seal 22, which may comprise any given number and arrangement of carbon ring segment(s) for example, to suit each given embodiment and application of the contact seal assembly 20B and/or the seal runner 30B.

As yet another example, while the oil collector groove 72, the space between the slingers 76 and 78, and the gutter 80 are defined by respective concave grooves, in other embodiments other shapes may be used, so long as the functionality of each of these elements as described herein is provided when that element is present in a given embodiment of the contact seal assembly 20B and/or the seal runner 30B. As yet another example, while the contact seal assembly 20B as described herein above is used with oil from the engine 10 as the cooling fluid, in other applications a different coolant may be used. To this end, elements such as the oil collector groove 72, and the like, may be generally referred to as a "coolant" collector groove 72, and the like, respectively.

As yet another example, while the present technology has been described with respect to the seal runner 30B which includes one or more internal cooling passages, the present technology may also be applied to other seal runners which may not necessarily be internally cooled and hence may not necessarily have any internal cooling passages. In some such embodiments, the coolant scoop(s) 50 may be shaped to circulate coolant along one or more outer surfaces of the seal runner 30B but not necessarily therethrough. In some such embodiments, the coolant scoop(s) may therefore be different than the coolant scoop(s) 50, and may for example be defined by different one or more parts of the seal runner 30B.

As yet another example, while the cavity 94 may be defined at least in part by the seal housing 24B, which in turn may be a part of the engine 10 as described in the above embodiments, in other embodiments and/or applications this need not be the case.

Still other modifications which fall within the scope of the present technology will be apparent to those skilled in the art, in light of a review of this disclosure, and such modifications are intended to fall within the appended claims.

The invention claimed is:

1. A contact seal assembly for a shaft of a gas turbine engine, comprising:
   a carbon seal mounted in a fixed position within a seal housing of the gas turbine engine, the carbon seal including a number of carbon ring segments that are rotationally stationary; and
   an annular seal runner adapted to be connected to the shaft of the gas turbine engine and rotatable relative to the carbon ring segments, the seal runner being disposed adjacent to and radially inwardly from the carbon ring segments to form a contact interface between the seal runner and the carbon ring segments which forms a substantially fluid tight seal;
   the seal runner having:
      a coolant scoop disposed in a cavity defined by the seal housing,
      a first slinger disposed between the coolant scoop and the contact interface,
      a second slinger disposed between the first slinger and the contact interface,
      a gutter disposed between the second slinger and the contact interface, and
      a coolant collector groove disposed between the first slinger and the second slinger;
   the seal housing having a projection extending in axially away from the carbon seal toward the coolant scoop, past the second slinger.

2. The contact seal assembly as defined in claim 1, further comprising a third slinger disposed between the second slinger and the contact interface.

3. The contact seal assembly as defined in claim 1, further comprising a third slinger disposed between the second slinger and the gutter.

4. The contact seal assembly as defined in claim 1, wherein:
the seal runner defines a fluid passage therethrough, the fluid passage defining a tortuous fluid flow path through the seal runner,
the coolant scoop is an inlet to the fluid passage,
the fluid passage has an outlet opposite to the inlet, and the outlet is defined by an axially-extending slot.

5. The contact seal assembly as defined in claim 4, wherein the seal runner defines a circumferentially extending outlet groove therein, and the axially-extending slot fluidly connects into the outlet groove.

6. The contact seal assembly as defined in claim 5, wherein the outlet groove is enclosed in the seal runner along a majority of a circumference thereof, and the seal runner defines a radially extending outlet that extends from a radially outer surface of the seal runner into the outlet groove.

7. A contact seal assembly for a shaft of a gas turbine engine, comprising:
a carbon seal mounted in a fixed position within a seal housing of the gas turbine engine, the carbon seal including a number of carbon ring segments that are rotationally stationary; and
an annular seal runner adapted to be connected to the shaft of the gas turbine engine and rotatable relative to the carbon ring segments, the seal runner being disposed adjacent to and radially inwardly from the carbon ring segments to form a contact interface between the seal runner and the carbon ring segments which forms a substantially fluid tight seal;
the seal runner having:
a coolant scoop disposed in a cavity defined by the seal housing,
a first slinger disposed between the coolant scoop and the contact interface,
a second slinger disposed between the first slinger and the contact interface, and
a coolant collector groove disposed between the first slinger and the second slinger;
wherein the seal runner defines a fluid passage therethrough, the fluid passage defining a tortuous fluid flow path through the seal runner, the coolant scoop is an inlet to the fluid passage, the fluid passage has an outlet opposite to the inlet, and the outlet is defined by an axially-extending slot, the seal runner defining a circumferentially extending outlet groove therein, and the axially-extending slot fluidly connects into the outlet groove, the outlet groove being enclosed in the seal runner along a majority of a circumference thereof, the seal runner defining a radially extending outlet that extends from a radially outer surface of the seal runner into the outlet groove;
wherein the radially extending outlet is a plurality of radially extending outlets distributed circumferentially along a radially outward outlet surface of the seal runner, the radially outward outlet surface extending axially from the coolant collector groove to the second slinger.

8. The contact seal assembly as defined in claim 7, wherein the seal housing includes a projection extending in axially away from the carbon seal toward the coolant scoop past the second slinger.

9. The contact seal assembly as defined in claim 1, wherein the projection terminates at an axial end, and the axial end is disposed axially between the coolant collector groove and the second slinger.

10. The contact seal assembly as defined in claim 9, wherein the projection, the second slinger and the gutter define a coolant collector cavity therebetween, the coolant collector cavity being tapered to slope radially away from the carbon seal.

11. The contact seal assembly as defined in claim 10, further comprising a third slinger disposed between the second slinger and the contact interface, and wherein the projection defines a separation wall extending into the coolant collector cavity, the separation wall being disposed radially opposite to the third slinger.

12. The contact seal assembly as defined in claim 11, wherein:
the separation wall is disposed in an upper portion of the coolant collector cavity;
the seal housing defines a cavity therein that contains at least a part of the shaft and at least a part of the seal runner that has the coolant scoop, the first slinger, and the coolant collector groove; and
the projection defines a gravity drain in a bottom portion of the coolant collector cavity, the gravity drain fluidly connecting the bottom portion to the cavity defined by the seal housing.

13. The contact seal assembly as defined in claim 9, wherein:
the carbon seal axially is movable relative to the seal runner through a range of axial displacements in an axial direction from the first slinger toward the second slinger during thermal expansion occurring during changing operating conditions of the contact seal assembly that are representative of an entirety of an operating envelope of the contact seal assembly;
the projection defines an axial distance between the axial end of the projection and a transverse side of the second slinger that faces toward the carbon seal; and
the projection is dimensioned such that axial distance is positive throughout the range of axial displacements.

14. The contact seal assembly as defined in claim 13, wherein:
the projection defines an axial distance between the axial end of the projection and a transverse side of the third slinger that faces toward the carbon seal; and
the axial distance between the axial end and the transverse side of the third slinger is selected such that the gutter remains under the projection throughout the range of axial displacements.

15. A gas turbine engine comprising one or more compressors, a combustor and one or more turbines, at least one of said compressors and at least one of said turbines being interconnected by an engine shaft rotating about a longitudinal axis thereof, at least one contact shaft seal being disposed about the rotating engine shaft to provide a fluid seal therewith, the contact shaft seal comprising a carbon seal mounted in a fixed position within a housing, and an annular seal runner fixed to the engine shaft for rotation within the carbon seal, the seal runner abutting the carbon seal during rotation of the seal runner to form a contact interface therebetween which forms a substantially fluid tight shaft seal, the seal runner having concentric inner and outer annular portions which define therebetween an internal fluid passage enclosed within the seal runner, the fluid passage defining a tortuous fluid flow path through the fluid passage and receiving cooling fluid therein for cooling the seal runner from within, the seal runner having an oil scoop disposed in fluid flow communication with the internal fluid passage to feed cooling oil into said fluid passage, a first slinger disposed between the oil scoop and the contact interface, a second slinger disposed between the first slinger and the contact interface, an oil collector groove disposed between the first slinger and the second slinger, and a third slinger deposed between the second slinger and the contact surface, a gutter being disposed between the third slinger and the contact interface.

16. The contact seal assembly as defined in claim 1, wherein the seal running includes an open topped channel between the first slinger and a forward end of the seal runner, the first slinger axially separating the opened topped channel and the coolant collector groove, and wherein radially inner surfaces of the coolant collector groove and the open topped channel are disposed at a similar radial depth in the seal runner.

17. The contact seal assembly as defined in claim 7, wherein the seal running includes an open topped channel between the first slinger and a forward end of the seal runner, the first slinger axially separating the opened topped channel and the coolant collector groove, and wherein radially inner surfaces of the coolant collector groove and the open topped channel are disposed at a similar radial depth in the seal runner.

18. The gas turbine engine as defined in claim 15, wherein the seal housing includes a projection extending in axially away from the carbon seal toward the oil scoop, past the second slinger.

19. The gas turbine engine as defined in claim 15, wherein the seal running includes an open topped channel between the first slinger and a forward end of the seal runner, the first slinger axially separating the opened topped channel and the oil collector groove, and wherein radially inner surfaces of the oil collector groove and the open topped channel are disposed at a similar radial depth in the seal runner.

* * * * *